(12) United States Patent
Phelps et al.

(10) Patent No.: US 6,529,298 B1
(45) Date of Patent: Mar. 4, 2003

(54) METHOD OF DEACTIVATING WORKING FIBER RESOURCES IN OPTICAL RING NETWORKS

(75) Inventors: Peter W. Phelps, Nepean (CA); Evert E. Deboer, Nepean (CA); Robert Caporuscio, Montreal (CA); Johnny Leung, Kirkland (CA); Paul Charron, St. Lambert (CA); Louis R. Pare, St. Bruno (CA); Joseph Olajubu, Essex (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/471,138

(22) Filed: Dec. 23, 1999

(51) Int. Cl.[7] ............................................... H04B 10/08
(52) U.S. Cl. ...................................... 359/110; 359/119
(58) Field of Search ................................. 359/110, 119, 359/173

(56) References Cited

U.S. PATENT DOCUMENTS

| | | | | |
|---|---|---|---|---|
| 5,717,796 A | * | 2/1998 | Clendening | 359/119 |
| 5,903,370 A | * | 5/1999 | Johnson | 359/119 |
| 6,046,832 A | * | 4/2000 | Fishman | 359/119 |
| 6,052,210 A | * | 4/2000 | Nathan | 359/119 |
| 6,222,653 B1 | * | 4/2001 | Asahi | 359/110 |
| 6,295,146 B1 | * | 9/2001 | Nathan et al. | 359/119 |

* cited by examiner

*Primary Examiner*—Kinfe-Michael Negash (57) ABSTRACT

The present invention provides a method of deactivating working fibers in an existing optical ring network or system for a cost-effective and efficient allocation of the fiber resources available in the ring network. When a working fiber is underutilized in an existing ring network, the traffic scheduled for transmission thereon is re-routed around the network away from the fiber and lockouts are applied to prevent the fiber to be removed from being protected. The fiber and associated connecting equipment thus become unused and unnecessary for traffic carrying purposes and can then be deactivated. By eliminating the need for working fibers and associated optics equipment on spans where traffic is low or non-existent, the invention can provide fiber capacity savings of up to fifty percent on each span while retaining full protection usage. According to the invention, the unused fibers and equipment can be removed or alternatively be re-provisioned for use in other network configurations to provide a cost-effective and efficient allocation of the resources available in the network.

36 Claims, 4 Drawing Sheets

METHOD OF DEACTIVATING WORKING FIBER RESOURCES IN OPTICAL RING NETWORKS

FIELD OF THE INVENTION

This invention relates generally to optical ring networks and more particularly to a method of deactivating working fiber resources in optical ring networks.

BACKGROUND ART

Today's optical transport networks employ a number of different topologies to satisfy increasing demands for network simplicity, cost containment, bandwidth efficiency and survivability. Common network topologies include point-to-point terminal configurations, linear add/drop multiplexer configurations and ring configurations. Of all these different topologies, ring configurations are often the preferred network configuration for applications requiring high transport capacity.

In optical ring networks, the bandwidth available in each fiber interconnecting nodes can be allocated in various ways to meet different capacity demands. In some ring configurations, the bandwidth available for transport can be provisioned as a single optical transmission path. However, in the vast majority of ring configurations, the bandwidth is partitioned into channels or wavelengths to increase capacity.

In optical ring networks as in other optical configurations, it is common to use the term fiber generally to denote traffic carrying capacity. As such, in addition to denote physical fibers, the term fiber can also be used to denote single channels or wavelengths in a physical fiber. For clarity and unless stated otherwise, the term fiber as applied generally to optical networks is hereinafter used to denote both a physical fiber and a single channel or wavelength within a physical fiber.

In addition to providing large capacity, optical ring systems are also designed with redundant equipment to have other attributes such as, for example, bidirectionality and/or increased reliability to reduce service failures. In conventional unidirectional and bidirectional ring systems for example, multiple fibers are commonly installed to achieve transmit and receive operations. Additional fibers are also installed to "protect" the working fibers in the event of a link (span) failure. Current ring protection schemes include dedicated protection, 1 protection fiber for each fiber or 1:1 protection which can be used in both path switched and line switched configurations.

In optical ring networks, some spans that interconnect nodes are not required to carry working traffic. This is either because there is no requirement for traffic or because there is too much capacity available and it cannot all be efficiently used. This is particularly true for dense wavelength division multiplex (DWDM) systems where the number of channels or wavelengths available on some spans can very well exceed the transport capacity required.

Currently, all spans separating adjacent nodes in a ring configuration have to be fiber equipped because of the protection usage that is necessary on a ring configuration. However, this requirement only makes use of protection fibers. On spans where traffic is low or non-existent, the working fibers present may never be used. As a result, the fiber capacity available in some optical ring networks may be underutilized. This is particularly true for long distance networks or continental networks where traffic is largely concentrated on East-West spans and little if any traffic is transmitted along North-South spans. In these networks, the fiber capacity on North-South spans is not efficiently utilized and in many instances may not be needed for traffic carrying purposes.

In addition to this ineffective use of fibers, the accommodation of multiple fibers between nodes necessitates at each node the installation of connection equipment for each fiber. However, duplicating this equipment for each fiber may also prove to have a considerable impact on the system cost, particularly on spans where the fiber capacity is underutilized.

Therefore, it would be desirable to use the existing working fiber capacity more efficiently in optical ring networks or alternatively deactivate underutilized fibers and associated equipment so that they can be removed or re-provisioned for use in other network configurations.

SUMMARY OF THE INVENTION

The present invention provides a method of deactivating working fiber resources in an existing optical ring network or system for a cost-effective and efficient allocation of the fiber resources available in the ring network. The invention can be applied to deactivate physical working fibers as well as working channels or wavelengths provisioned on a physical working fiber. The term fiber is therefore used to denote both a physical fiber and a channel or wavelength provisioned on a physical fiber.

According to the invention, when a working fiber between any two nodes in an existing ring network is underutilized, the traffic scheduled for transmission thereon is re-routed around the network away from the fiber. As a result, the fiber and associated connecting equipment thus become unused and unnecessary for traffic carrying purposes and can then be deactivated.

Advantageously, the present invention eliminates the need for working fibers and associated optics equipment on spans where traffic is low or non-existent and can provide fiber and equipment capacity savings of up to fifty percent on each span while retaining full protection usage. According to the invention, the unused fibers and equipment can be removed or alternatively be re-provisioned to provide a cost-effective and efficient allocation of the resources available in the network.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The present invention provides a method of deactivating working fiber resources in an existing optical ring network or system for a cost-effective and efficient allocation of the fiber resources available in the ring network. The invention applies to the deactivation of physical working fibers as well as working channels or wavelengths. For clarity and generality, the term "fiber" as used in the description of the preferred embodiments provided below denotes a physical fiber or a channel/wavelength provisioned on a physical fiber.

The invention can be used in any optical network or system for optimizing the use of fiber equipment and connections available on spans where traffic is low or nonexistent. According to the invention, the traffic present on underutilized fibers is re-routed making these fibers unused and unnecessary for traffic carrying purposes. The unused working fibers and associated equipment are then de-activated and can be removed or alternatively re-provisioned for use in other network configurations.

Figure 1:
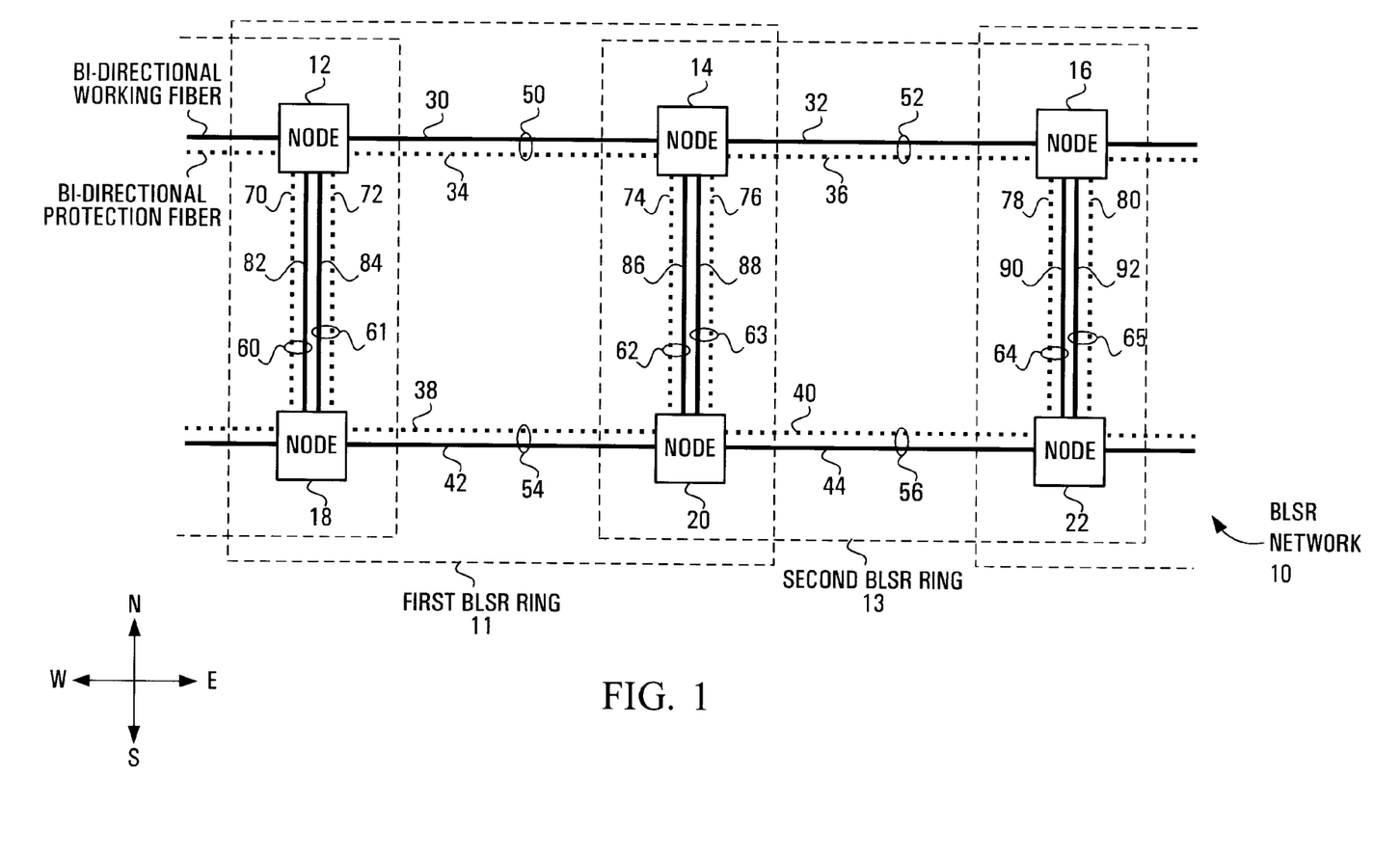
FIG. 1 is a diagram of a conventional four-fiber bidirectional line switched ring (BLSR) network featuring a plurality of working fibers.

In a preferred embodiment, the invention is used in a bidirectional line switched ring (BLSR) network. An example of a conventional four-fiber BLSR optical network with which the invention can be used is shown in FIG. 1 generally denoted by 10. The BLSR network 10 consists of multiple rings interconnected at common nodes 12, 14, 16, 18, 20, 22 connected to form a series of interworking rings. For the purpose of example, FIG. 1 only shows two complete rings where a first ring 11 is formed of nodes 12, 14, 18, 20 and a second ring 13 is formed of nodes 14, 16, 20, 22. The nodes 12, 14, 16, 18, 20, 22 are interconnected with a number of bidirectional East-West and North-South fiber spans which can provide working and protection transport between the nodes 12, 14, 16, 18, 20, 22.

More specifically, the nodes 12, 14, 16 are interconnected with bidirectional East-West fiber spans 50, 52 where each East-West fiber span 50, 52 consists of a bidirectional working fiber 30, 32 (shown as a full line) and a bidirectional protection fiber 34, 36 (shown as a dotted line). Similarly, the nodes 18, 20, 22 are interconnected with bidirectional East-West fiber spans 54, 56 each formed of a bidirectional working fiber 42, 44 (full line) and a bidirectional protection fiber 38, 40 (dotted line).

The nodes 12, 14, 16 are respectively interconnected with the nodes 18, 20, 22 with a number of North-South fiber spans. More specifically, node 12 is interconnected with node 18 with a first pair of North-South fiber spans 60, 61. Between these nodes 12, 18, the span 61 provides North-South connectivity for traffic circulating in ring 11 while the span 60 provides connectivity for traffic circulating in an adjacent ring (not shown). Similarly, node 14 is interconnected with node 20 via a second pair of North-South fiber spans 62, 63 and node 16 is interconnected with node 22 with a third pair of North-South fiber spans 64, 65 where each span provides North-South connectivity for a particular ring. Each North-South fiber span 60, 61, 62, 63, 64 and 65 consists of a working fiber 82, 84, 86, 88, 90, 92 (full line) and a protection fiber 70, 72, 74, 76, 78, 80 (dotted line).

In the BLSR network 10, the bidirectional working and protections fibers described above with respect to the East-West fiber spans 50, 52, 54, 56 and the North-South fiber spans 60, 61, 62, 63, 64, 65 each consists of a pair of unidirectional physical fibers or channels. Therefore, on each span 50, 52, 54, 56, 60, 61, 62, 63, 64, 65, four unidirectional physical fibers or channels are used. It is to be understood that this is merely an example. If necessary, the BLSR network 10 could be designed with a different configuration to meet different capacity demands. For example, the BLSR network could be designed with additional physical fibers or wavelengths on each span 50, 52, 54, 56, 60, 61, 62, 63, 64, 65 to meet higher channel capacity requirements. Conversely, a two-fiber BLSR configuration could be used where each span 50, 52, 54, 56, 60, 61, 62, 63, 64, 65 is implemented using a single bidirectional fiber for both working and protection bandwidth. In the following description and for the purpose of example only, the BLSR network 10 is assumed to be a four-fiber network.

In the BLSR network 10, traffic is typically routed with standard network management applications such as the well-known integrated network management (INM). For the purpose of example, it is hereinafter assumed that the network management application used in the BLSR network 10 to route traffic is INM.

INM provides the necessary functionality to route traffic around the BLSR network 10. In the absence of failures, INM manages the routing of working traffic between the nodes 12, 14, 16, 18, 20, 22 along the East-West working fiber 30, 32, 42, 44 and the North-South working fibers 82, 84, 86, 88, 90, 92 present in the network 10. As is conventional, a localized controller present at each node 12, 14, 16, 18, 20, 22 supports the protection capabilities of span and ring switches redirecting traffic around failures. In the event of a failure or degradation of a working fiber, the nodes 12, 14, 16, 18, 20, 22 can enter a span switching mode to redirect traffic away from the fault and prevent a service outage. In this mode, the interrupted traffic is redirected from the defective working fiber onto a protection fiber available between the affected nodes 12, 14, 16, 18, 20, 22 thereby maintaining service for all terminating (span) and pass-through (ring) traffic. If a fault affects an entire fiber span between any two adjacent nodes 12, 14, 16, 18, 20, 22 (e.g. a node failure or a cable cut of both working and protection fibers in the fiber span), the affected traffic can be re-directed around the network 10 by ring protection switching.

In the BLSR network 10, all fiber spans 50, 52, 54, 56, 60, 61, 62, 63, 64, 65 separating adjacent nodes 12, 14, 16, 18, 20, 22 have to be fiber equipped because of the protection usage that is necessary on a ring protection switch. However, this requirement only makes use of the protection fibers 34, 36, 38, 40, 70, 72, 74, 76, 78, 80. If there are fiber spans 50, 52, 54, 56, 60, 61, 62, 63, 64, 65 in the network 10 where traffic is light, the working fibers in these spans 50, 52, 54, 56, 60, 61, 62, 63, 64, 65 may be under-utilized and in some cases unused. In optical ring networks such as the BLSR network 10, it is quite common that traffic is concentrated on East-West fiber spans with little or no traffic transmitted along North-South spans. In such networks, the working fiber bandwidth available on these North-South spans is not efficiently utilized and in many instances may not even be needed for traffic carrying purposes. Because of this, the capital investment incurred in installing and maintaining these underutilized fibers and terminating equipment may not be justified.

To obtain better bandwidth efficiency and contain costs, it is possible to deactivate underutilized working fibers and associated connecting optics equipment present therein. According to the invention, the deactivated fibers and associated equipment can be then removed or alternatively re-provisioned for use in other network configurations. For example, if there is little or no traffic on the North-South spans 60, 61, 62, 63, 64, 65, it is possible to remove some or all of the working fibers 82, 84, 86, 88, 90, 92 with their respective optics equipment. Alternatively, it is possible to maintain and re-provision underutilized working fibers and equipment for use in other network configurations. Re-provisioning underutilized fibers and associated equipment would maximize the full capacity of the equipment bay by not leaving any slots vacant therein which could otherwise be used for other purposes in the same or other network configurations.

According to the invention, it is also possible to deactivate underutilized working fibers and equipment that may be present in the East-West fiber spans 50, 52, 54, 56. For the purpose of example, the following description is restricted to the deactivation of North-South working fibers 82, 84, 86, 88, 90, 92 in the North-South spans 60, 61, 62, 63, 64, 65. It is understood however that this description also applies to the deactivation of underutilized working fibers and equipment in the East-West fiber spans 50, 52, 54 and 56.

Figure 2:
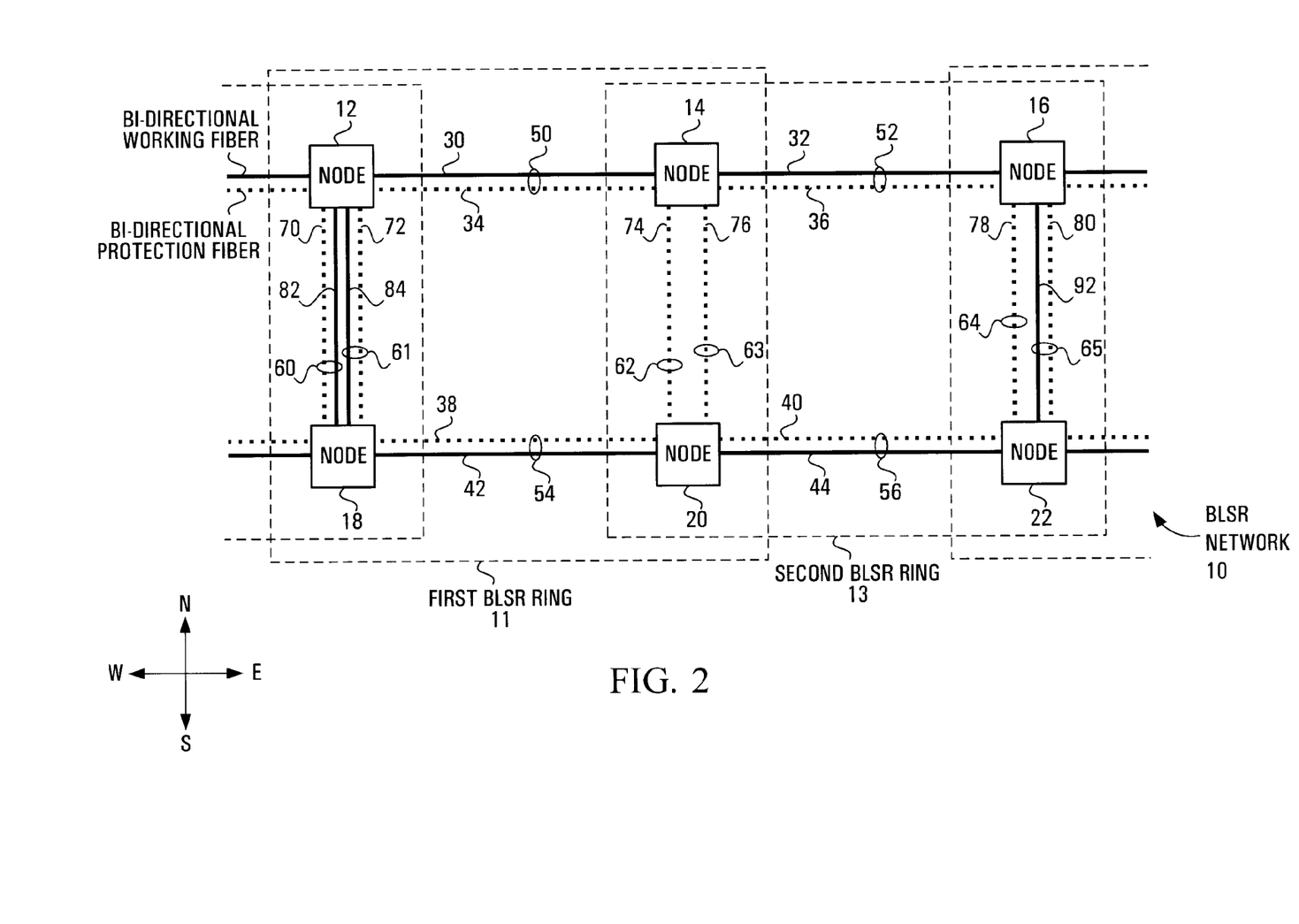
FIG. 2 is a diagram of the four-fiber BLSR network of FIG. 1 with a reduced plurality of working fibers according to a preferred embodiment of the invention.

FIG. 2 illustrates as an example the network 10 of FIG. 1 where the working fibers 86, 88 of span 62 and 63, the working fiber 90 of span 64 and their respective connecting equipment (not shown) have been deactivated and removed. Despite removing the working fibers 86, 88 and 90 however, the spans 62, 64 are still equipped with the protection fibers 74, 76, 78, 80 and can still provide full ring protection if necessary.

According to the invention, other North-South working fiber deactivation scenarios to improve bandwidth efficiency and contain costs in the network 10 are possible. For example, the working fiber 92 present in the North-South span 65 could also be deactivated. Similarly, the working fiber 82 present on the North-South span 60 could also be deactivated. Generally, the working fiber capacity present in the North-South spans 60, 61, 62, 63, 64 and 65 can all be completely deactivated if underutilized. For the purpose of example, the following description is restricted to the deactivation of the working fiber 86 in the North-South span 62. However, it is understood that this description also applies to the deactivation of any other working fiber in any span on this ring network 10.

In order to deactivate the working fiber 86 and associated connecting equipment, the working traffic scheduled at nodes 14, 20 to be transmitted on the North-South span 62 is rerouted away from the under-utilized working fiber 86. In addition, access to the protection fiber 74 is locked out to prevent the span 62 from completing any switch to the protection fiber 74 as the working fiber 86 or connecting equipment is deactivated.

To re-route traffic away and lock out access to the working fiber 86, a new INM mode hereinafter referred to as the working optics removed (WOR) mode is defined and applied at each node 14, 20 terminating the working fiber 86 to be deactivated. When operating in this mode, the nodes 14, 20 redirect working traffic away from the North-South fiber span 62.

More specifically, when the WOR mode is enabled, the traffic scheduled to transmit on the working fiber 86 and terminating at nodes 14, 20 (referred to as span traffic) or passing through the nodes 14, 20 (referred to as ring traffic) is instead rerouted around the network 10 for transmission on one or more alternate paths interconnecting the nodes 14, 20. For example, the span and ring traffic originally scheduled at node 14 to be transmitted to node 20 via the fiber 86 could instead be rerouted through the nodes 12 and 18 via the working fibers 30, 84 and 42. The manner in which span and ring traffic can be rerouted between the nodes 14 and 20 on paths other than the fiber 86 would be obvious to a person skilled in the art and is not described here in any detail.

In addition to re-routing traffic, the nodes 14, 20 also each lock out access to the protection fiber 74. For this, two lockouts are applied at each node 14, 20: a lockout of working span and a lockout of working ring. Despite the absence of any traffic on the working fiber 86 (because of the re-routing), these lockouts are necessary to prevent the fiber span 62 from completing a span or ring switch to the protection fiber 74 when the working fiber 86 or connecting equipment is deactivated. However, these lockouts will not preempt ring protection switches in force on the span 62 and as such, the protection fiber 74 can still provide full ring protection capabilities to traffic elsewhere on the ring 11 when necessary.

By enabling the WOR mode in the nodes 14, 20, traffic to transmit on the working fiber 86 is rerouted around the network 10 on alternate paths and access to the protection fiber 74 is "locked out" so that the working fiber 86 and associated equipment can be deactivated. Once deactivated, the fiber 86 can then be disconnected and can be removed or re-provisioned. Similarly, the connecting equipment associated with the fiber 86 which typically includes circuit packs can be also be removed or re-provisioned for use in alternative network configurations.

According to the invention, the WOR mode should preferably be defined to automatically disable any alarm activated in relation to missing equipment. For example, the WOR mode should be defined to automatically disable circuit pack missing alarms which may be activated when the fiber connecting equipment is removed. Further, in the preferred embodiment, it should not be possible to activate the WOR mode when working channel connections are provisioned across the fiber span 62.

In the preferred embodiment of the invention described above, working channel connections cannot be provisioned on the fiber span 62 while the WOR mode is in effect. This is because when the WOR mode is enabled, the nodes 14, 20 prevent access to the underutilized fiber 86 so that as noted above, the fiber 86 can be deactivated. However, by preventing access to the fiber 86, working channel connections cannot be established across the fiber span 62.

There may be situations where it is desirable to deactivate underutilized working fibers on some spans yet still retain the ability to provision channel connections across these spans. For example, in matched node network configurations equipped with drop and continue on working (DCW) traffic connectivity, it is often desirable to remove underutilized working fibers yet preserve the ability to provision channel connections on spans where DCW connectivity is necessary.

Figure 3:
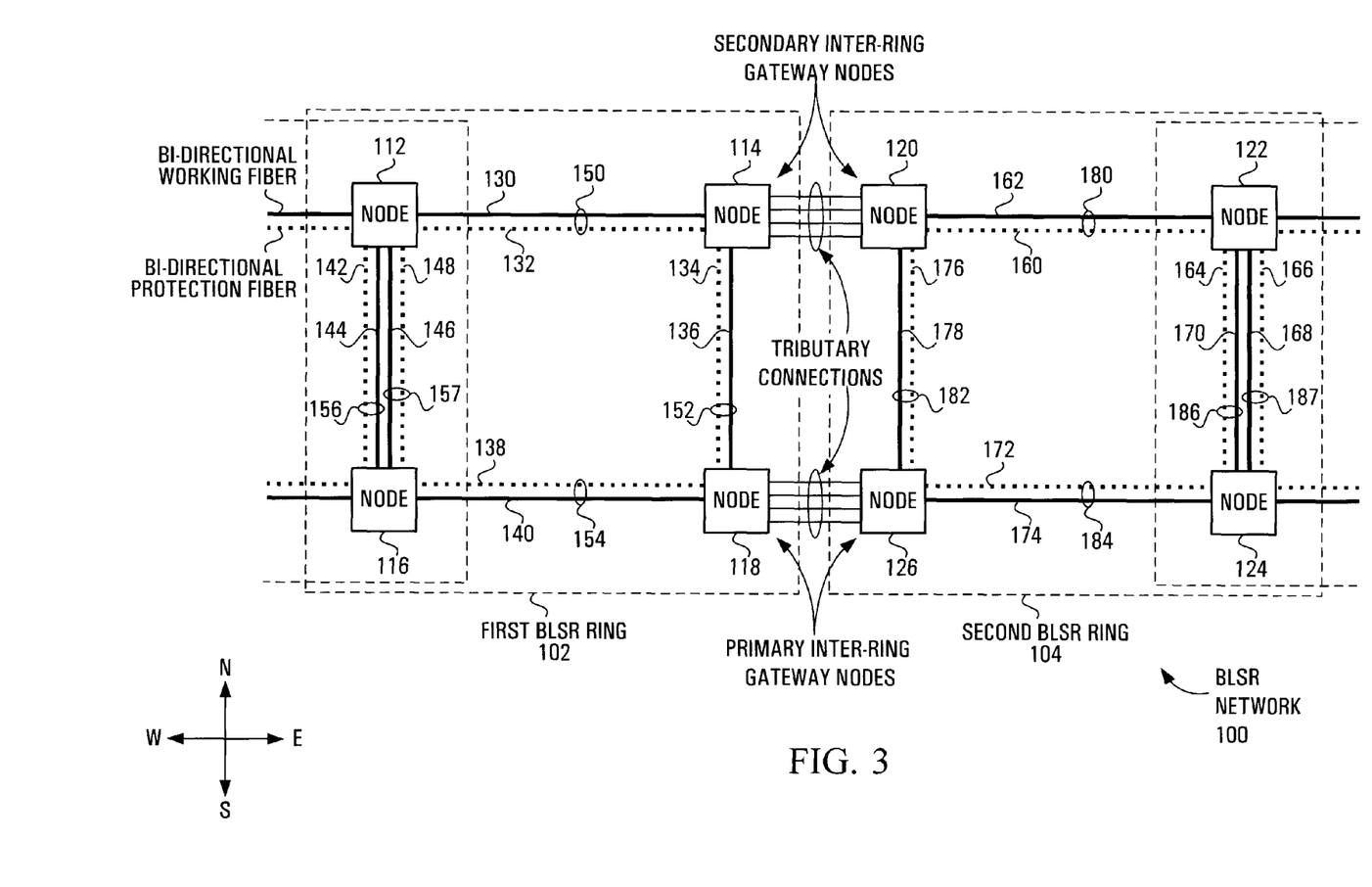
FIG. 3 is a diagram of a conventional four-fiber matched node BLSR network featuring a plurality of working fibers.

An example of a conventional matched node BLSR network which supports DCW traffic is shown in FIG. 3 and is generally denoted by 100. Similarly to the BLSR network 10 of FIG. 1, the BLSR network 100 is also formed of a series of interconnected BLSR rings. FIG. 3 only shows two complete BLSR rings 102, 104 and for the purpose of example, only these two rings 102, 104 will now be described.

The first ring 102 is formed of a plurality of nodes 112, 114, 116, 118 (only four shown) interconnected with bidirectional East-West fiber spans 150, 154 and North-South fiber spans 152, 156, 157. The East-West fiber spans 150, 154 each consists of a working fiber 130, 140 (full line) and a protection fiber 132, 138 (dotted line). The span 150 interconnects node 112 with node 114 while the span 154 interconnects node 116 with node 118. Similarly to the spans 150, 154, the North-South fiber spans 152, 156, 157 each consists of a working fiber 136, 144, 146 (full line) and a protection fiber 134, 142, 148 (dotted line). The span 152 interconnects node 114 with node 118 while the spans 156, 157 interconnect node 112 with 116. Between these nodes 112, 116, the span 157 provides North-South connectivity for traffic circulating in ring 102 while the span 156 provides connectivity for traffic circulating in an adjacent ring (not shown).

Similarly, the second ring 104 is formed of a plurality nodes 120, 122, 124, 126 (only four shown) interconnected with bidirectional East-West spans 180, 184 and North-South spans 182, 186, 187. The East-West spans 180, 184 each consists of a working fiber 162, 174 (full line) and a protection fiber 160, 172 (dotted line). The span 180 interconnects node 120 with node 122 while the span 184 interconnects node 126 with node 124. Similarly to the spans 180, 184, the North-South fiber spans 182, 186, 187 each consists of a working fiber 178, 170, 168 (full line) and a protection fiber 176, 164, 166 (dotted line). The span 182 interconnects node 120 with node 126 while the spans 170 and 168 interconnect node 122 with node 124. Similarly to the spans 156, 157 interconnecting node 112 with node 116 in the first ring 102, the span 186 provides North-South connectivity for traffic circulating in ring 104 while the span 187 provides connectivity for traffic circulating in an adjacent ring (not shown).

In the network 100, the rings 102, 104 are interconnected via tributary connections established between node 114 and node 120 and between node 118 and node 126. Each of these nodes 114, 118, 120, 126 has a plurality of tributary interfaces able to support interconnections with an adjacent ring. These interconnections provide the necessary support for inter-ring traffic.

In order to protect inter-ring traffic, the nodes 118 and 126 are configured as primary inter-ring gateway nodes and the nodes 114, 120 are provisioned as secondary inter-ring gateway nodes. For outbound traffic going from ring 102 to ring 104, DCW routing is employed within the primary gateway node 118 in ring 102 to pass the exiting traffic simultaneously to both the adjacent ring 104 and the secondary node 114. Outbound traffic directed from ring 104 to ring 102 is similarly transmitted using the same DCW routing and path selection technique. For clarity, the manner in which this is performed will now be described only in relation to traffic going from ring 102 to 104.

The outbound traffic going from ring 102 to 104 is transmitted as a primary transmission from the primary node 118 via tributary connections to the primary node 126 of the ring 104. In addition, the outbound traffic is also "dropped" on the working fiber 136 for transmission to the associated secondary gateway node 114. From the secondary node 114, the outbound traffic is then passed across tributary connections to the node 120 and subsequently forwarded therefrom as a secondary transmission to node 126 via the working fiber 178. At node 126, a service selector (not shown) bridges the primary transmission through. If a failure occurs interrupting or corrupting the primary transmission, the selector can alternatively bridge the secondary transmission through to complete the outbound transmission.

As is well known, the provisioning of primary and secondary nodes in the rings 102, 104 is not unique. In the network 100, a node, provisioned as a primary node (such as the nodes 118, 126) for a particular outbound transmission may also be provisioned as a secondary node for other outbound transmissions. In the same fashion, a node provisioned as a secondary node may also be provisioned as a primary node. Further, a primary node on one ring may feed either a primary or secondary node on an adjacent ring. This is also true of secondary nodes. More specifically, a secondary node on one ring may forward its transmissions to either a primary or secondary node on an adjacent ring. For the purpose of example however, it is hereinafter assumed that the nodes 114, 118, 120, 126 are connected as shown in FIG. 3 and that only the nodes 118 and 126 are configured as primary nodes while only the nodes 114, 120 are configured as secondary nodes.

As in most ring configurations, traffic in the network 100 is typically concentrated on the East-West fiber spans 150, 154, 180, 184. With the exception of DCW traffic on the spans 152, 182, the North-South spans 152, 156, 157, 182, 186, 187 may have little or no traffic. According to the invention, it is also possible to improve bandwidth efficiency on the North-South spans 156, 157, 186, 187 and also on the spans 152, 182 (despite the presence of DCW traffic) by deactivating working fibers which are normally underutilized or unused.

On the North-South spans 156, 157, 186, 187, there is no DCW traffic and the working fibers 144, 146, 170 can be deactivated as previously described i.e. by enabling a WOR mode at each terminating node 112, 116, 122, 124 and rerouting traffic around the network 100 on alternate paths.

On the North-South spans 152, 182, the working fibers 136, 178 present normally carry DCW traffic between the primary nodes 118, 126 and the secondary nodes 114, 120. However, with the exception of DCW traffic, these fibers 136, 178 are typically underutilized or unused. According to another embodiment of the invention, these fibers 136, 178 can also be deactivated from the spans 152, 182.

Figure 4:
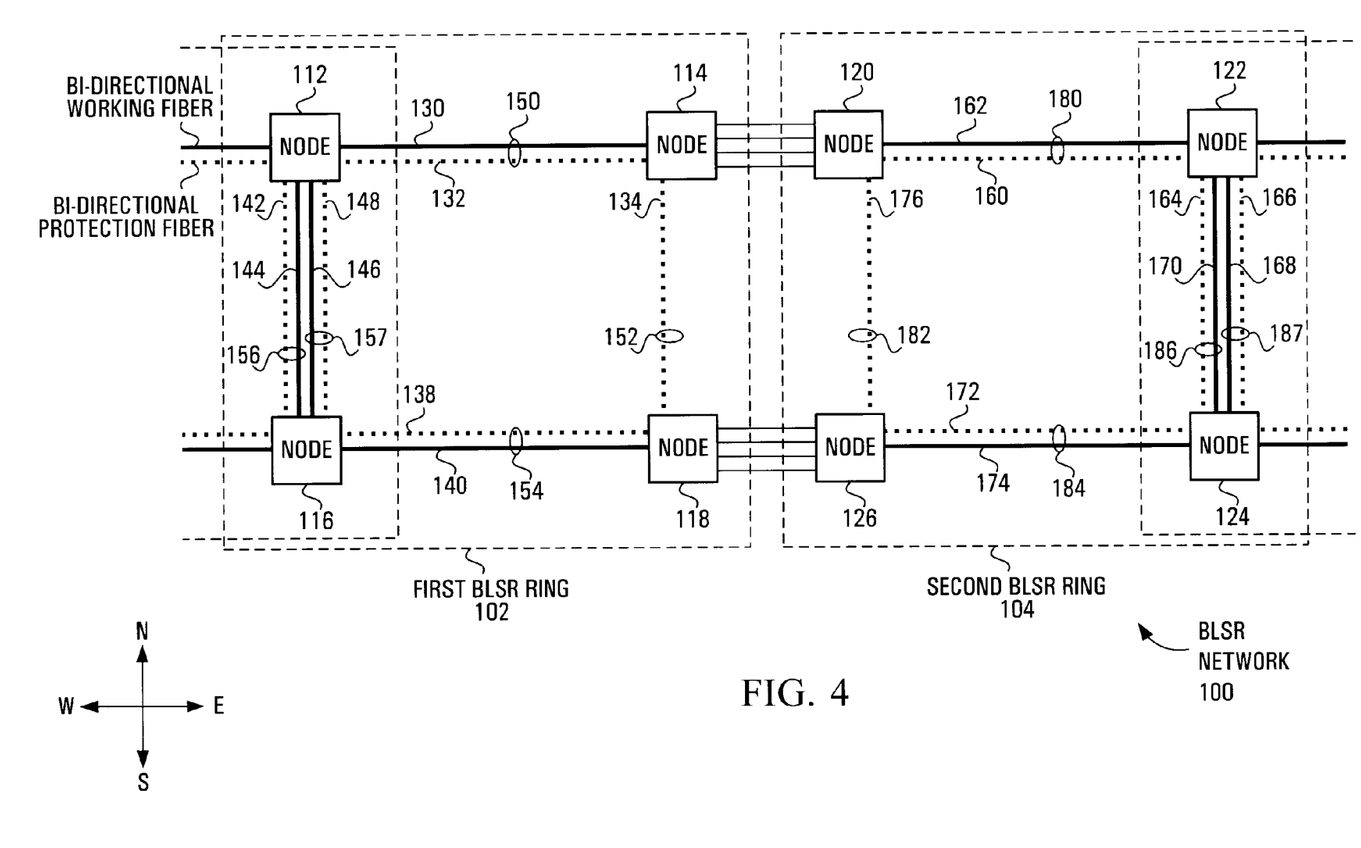
FIG. 4 is a diagram of the four-fiber matched node BLSR network of FIG. 3 with a reduced plurality of working fibers according to another preferred embodiment of the invention.

FIG. 4 illustrates as an example the network 100 of FIG. 3 where the working fibers 136, 178 normally responsible for DCW traffic on the North-South spans 152, 182 have been deactivated and removed. The method by which the fiber 178 is deactivated is identical to the manner in which the fiber 136 is deactivated and will now be described below only in relation to the deactivation of the fiber 136. However, it is to be understood that the following description also applies to the deactivation of the fiber 178.

In order to deactivate the working fiber 136, traffic other than DCW traffic is redirected away from the fiber 136. In addition, a channel connection is provisioned on the protection fiber 134 by means of a persistent user manual protection switch to place the DCW on the protection fiber 134 and maintain the necessary DCW traffic connectivity across the span 152.

For this, a new INM mode hereinafter referred to as the lockout of working unequipped (LWO-U) mode is defined and applied at each node 114, 118 terminating the fiber 136 to be removed. When operating in this mode, the nodes 114, 118 are provisioned to direct traffic away from the fiber 136 and around the ring 102. More specifically, when the LWO-U mode is activated, the span and ring traffic (other than DWC traffic) is routed around the ring 102 on alternate paths interconnecting the nodes 114, 118. The manner in which this particular traffic is routed around the network 100 on alternate paths would also be obvious to a person skilled in the art and is not described here.

In addition, the nodes 114, 118 each locks out access to the protection fiber 134 on the span 152 with a lockout of working span and a lockout of working ring. According to the invention, these span and ring lockouts respectively prevent the fiber span 152 from completing a span and ring switch of the span and ring traffic (other than DCW traffic) to the protection fiber 134 when the working fiber 136 or connecting equipment is deactivated and causes a signal fail or signal degrade condition on the span 152. These lockouts will not however preempt ring protection switches in force on the span 152 and as such, the protection fiber 134 can still provide full ring protection capabilities to traffic elsewhere on the ring 102 when necessary.

With respect to the DWC traffic, the nodes 114, 118 provision a channel connection on the protection fiber 134 to maintain the necessary DCW traffic connectivity across the span 152. More specifically, a user invoked manual switch is permanently applied at the nodes 114, 118 to position the DCW traffic on the protection fiber 134. In order to redirect DCW traffic on the protection fiber 134, the manual switch preempts the span and ring lockouts described above. It will be recalled that these lockouts prevent automatic switch access to the protection fiber 134. However, they are not designed to preempt user requests. Because the manual switch is applied as a user request, the manual switch can override the span and ring lockouts and place the DCW traffic onto the protection fiber 134 despite the presence of the span and ring lockouts.

Similarly to the span and ring lockouts however, this persistent manual switch will not preempt any ring protection switches from using the span 152. As a result, the protection fiber 134 can still provide full ring protection capabilities to traffic elsewhere on the ring 102 but will also accommodate the DCW traffic when not used for ring protection. This is because the manual switch is a special persistent manual switch that recurs after being preempted by a ring protection switch.

Therefore by placing the DCW traffic on the protection fiber 134, the working fiber 136 can thus be deactivated for removal and the necessary DCW connectivity on the span 152 maintained.

With the LWO-U mode activated at the nodes 114, 118, the span and ring traffic (except the DCW traffic) is redirected around the network 10, access to the protection fiber 134 is "locked out" and the DCW traffic is manually switched on the protection fiber 134. As a result, the working fiber 136 can be removed or re-provisioned. According to the invention, the LWO-U mode should preferably be defined to automatically disable any alarm activated when optics equipment is removed or re-provisioned. For example, the LWO-U mode should be defined to automatically disable circuit pack missing alarms which may be activated when the working fiber 136 or its connecting equipment is removed.

While the invention has been described above with reference to a particular network topology, further modifications and improvements to support other network configurations which will occur to those skilled in the art, may be made within the purview of the appended claims, without departing from the scope of the invention in its broader aspect.

In the first embodiment, the invention has been described above in relation to a BLSR network configuration formed of a series of interworking rings. It is understood that for this particular embodiment, the invention could alternatively be used in relation to BLSR network configurations with different ring arrangements. For example, the invention could apply to a BLSR network configuration which consists of a single ring. In this case, the nodes forming the BLSR network would not need to provide matched node support.

With respect to the second embodiment, it is to be understood that on spans where working fibers are to be removed, the invention is not restricted to maintaining working connections for DCW traffic across these spans. There may be situations where it is desirable to maintain different connections for different traffic. It is understood that the invention as described in this particular embodiment could also apply to these situations. For example, the invention could also be used to maintain a protection connection for drop and continue on protection (DCP) traffic which could be present on spans where working fibers are to be removed. In this particular example, the span and ring traffic would still be rerouted around the network and the span and ring lockouts described above would still be required to prevent the working fiber to be deactivated from being protected. However, the persistent manual switch described above as directing DCW traffic onto a protection fiber would not be required as the DCP is already routed onto the protection fiber.

We claim:

1. A method of deactivating a first fiber interconnecting a first node and a second node in an optical ring network where the first interconnecting fiber defines a working path for traffic between the first and second nodes and where a second interconnecting fiber defines a protection path for protecting traffic between the first and second nodes, the optical ring network being formed of a plurality of nodes interconnected with multiple fibers which define multiple working paths and protection paths, the method comprising at each of the first and second nodes:

routing the traffic scheduled for transmission on the first interconnecting fiber via another working path defined in the optical network between the first and second nodes;

locking out access to the second fiber interconnecting the first and second node to prevent the first interconnecting fiber from being protected by the second interconnecting fiber; and deactivating the first interconnecting fiber.

2. The method of claim 1 wherein locking out access to the second fiber interconnecting the first and second node to prevent the first interconnecting fiber from being protected by the second interconnecting fiber comprises:

applying a lockout of working span on the second interconnecting fiber to prevent the first interconnecting fiber from being protected by a span switch; and applying a lockout of working ring to prevent the first interconnecting fiber from being protected by a ring switch.

3. The method of claim 1 wherein locking out access to the second fiber interconnecting the first and second node to prevent the first interconnecting fiber from being protected by the second interconnecting fiber does not preempt ring protection switches in the optical ring network.

4. The method of claim 1 wherein locking out access to the second fiber interconnecting the first and second node to prevent the first interconnecting fiber from being protected by the second interconnecting fiber is done when no protection switches is in effect in the optical ring network.

5. The method of claim 1 wherein locking out access to the second fiber interconnecting the first and second node to prevent the first interconnecting fiber from being protected by the second interconnecting fiber is done when the first interconnecting fiber does not carry any span or ring traffic.

6. The method of claim 1 further comprising removing the first interconnecting fiber.

7. The method of claim 1 further comprising provisioning the first interconnecting fiber for use in another optical network.

8. The method of claim 1 wherein the first and second nodes are each connected to the first interconnecting fiber with respective fiber connecting equipment, the method further comprising deactivating at each of the first and second nodes the corresponding fiber connecting equipment.

9. The method of claim 8 further comprising removing at each of the first and second nodes the corresponding fiber connecting equipment.

10. The method of claim 9 further comprising disabling at each of the first and second nodes fiber connecting equipment missing alarms associated with the corresponding fiber connecting equipment.

11. The method of claim 9 wherein at each of the first and second nodes, the corresponding fiber connecting equipment comprises line circuit packs.

12. The method of claim 9 further comprising provisioning at each of the first and second nodes the corresponding fiber connecting equipment for use in another optical network.

13. The method of claim 1 wherein locking out access to the second fiber interconnecting the first and second node to prevent the first interconnecting fiber from being protected by the second interconnecting fiber is done with a network management tool.

14. The method of claim 1 wherein the optical ring network is a bidirectional line switched ring (BLSR) network.

15. The method of claim 14 wherein the BLSR network consists of multiple interconnected optical rings.

16. The method of claim 14 wherein the BLSR network consists of a single optical ring.

17. A method of deactivating a first fiber interconnecting a first node and a second node in an optical ring network where the first interconnecting fiber defines a working path for traffic between the first and second nodes and where a second interconnecting fiber defines a protection path for protecting traffic between the first and second nodes, the optical ring network being formed of a plurality of nodes interconnected with multiple fibers which define multiple working paths and protection paths, the method comprising at each of the first and second nodes:

routing a first portion of the traffic scheduled for transmission on the first interconnecting fiber to another working path defined in the optical ring network between the first and second nodes;

routing a second portion of the traffic scheduled for transmission on the first interconnecting fiber to the protection path defined between the first and second nodes by the second interconnecting fiber;

locking out access to the second interconnecting fiber to prevent the first interconnecting fiber from being protected by the second interconnecting fiber;

deactivating the first interconnecting fiber.

18. The method of claim 17 wherein the first portion of the traffic scheduled consists of span and ring traffic and wherein the second portion of the traffic scheduled for transmission on the first interconnecting fiber consists of drop and continue on working (DCW) traffic.

19. The method of claim 17 wherein the first portion of the traffic scheduled consists of span and ring traffic and wherein the second portion of the traffic scheduled for transmission on the first interconnecting fiber consists of drop and continue on protection (DCP) traffic.

20. The method of claim 17 wherein locking out access to the second interconnecting fiber to prevent the first interconnecting fiber from being protected by the second interconnecting fiber comprises:

applying a lockout of working span on the second interconnecting fiber to prevent the first interconnecting fiber from being protected by a span switch; and applying;a lockout of working ring to prevent the first interconnecting fiber from being protected by a ring switch.

21. The method of claim 20 wherein routing a second portion of the traffic scheduled for transmission on the first interconnecting fiber to the protection path defined between the first and second nodes by the second interconnecting fiber comprises applying a manual switch to direct the DCW traffic scheduled for transmission on the first interconnecting fiber to the second interconnecting fiber.

22. The method of claim 21 wherein the DCW traffic scheduled for transmission on the first interconnecting fiber is directed to the second interconnecting fiber when the second interconnecting fiber is not used in a ring protection request.

23. The method of claim 18 wherein locking out access to the second interconnecting fiber to prevent the first interconnecting fiber from being protected by the second interconnecting fiber is done when no protection switch is in effect in the optical ring network.

24. The method of claim 18 wherein locking out access to the second interconnecting fiber to prevent the first interconnecting fiber from being protected by the second interconnecting fiber is done when the first interconnecting fiber does not carry any span or ring traffic.

25. The method of claim 17 further comprising removing the first interconnecting fiber.

26. The method of claim 17 further comprising provisioning the first interconnecting fiber for use in another optical network.

27. The method of claim 17 wherein the first and second nodes are each connected to the first interconnecting fiber with respective fiber connecting equipment, the method further comprising deactivating at each of the first and second nodes the corresponding fiber connecting equipment.

28. The method of claim 27 further comprising removing at each of the first and second nodes the corresponding fiber connecting equipment.

29. The method of claim 28 further comprising disabling at each of the first and second nodes fiber connecting equipment missing alarms associated with the corresponding fiber connecting equipment.

30. The method of claim 28 wherein the fiber connecting equipment at each of the first and second nodes comprises line circuit packs.

31. The method of claim 27 further comprising provisioning at each of the first and second nodes the corresponding fiber connecting equipment for use in another optical network.

32. The method of claim 21 wherein locking access to the first interconnecting fiber and applying a manual switch to direct the DCW traffic scheduled to the second interconnecting fiber is done with a network management tool.

33. The method of claim 17 wherein the optical ring network is a bidirectional line switched ring (BLSR) network.

34. The method of claim 33 wherein the BLSR network consists of multiple interconnected optical rings.

35. The method of claim 33 wherein the BLSR network consists of a single optical ring.

36. A method of routing traffic between a first and a second node in an optical network where the first and second nodes are interconnected with a first and second fiber each defining a respective working path and a protection path, the optical network being formed of a plurality of nodes interconnected with at least one fiber which define multiple working paths and protection paths in the optical network, the method comprising at each of the first and second nodes:

scheduling traffic for transmission to the corresponding one of the first and second nodes;

routing the traffic scheduled from the first node to the second node via the first interconnecting fiber;

if the first interconnecting fiber is to be removed, re-routing the traffic scheduled via another working path defined in the optical network between the first and second nodes; and locking access to the second interconnecting fiber at the first and second nodes to prevent the first interconnecting fiber from being protected by the second interconnecting fiber.

* * * * *

UNITED STATES PATENT AND TRADEMARK OFFICE
CERTIFICATE OF CORRECTION

| | | |
|---|---|---|
| PATENT NO. | : 6,529,298 B1 | Page 1 of 1 |
| DATED | : March 4, 2003 | |
| INVENTOR(S) | : Peter W. Phelps et al. | |

It is certified that error appears in the above-identified patent and that said Letters Patent is hereby corrected as shown below:

<u>Column 12,</u>
Line 6, after the word "applying" a semicolon ";" has been inserted; it should be deleted.

Signed and Sealed this

Twenty-eighth Day of October, 2003

JAMES E. ROGAN
*Director of the United States Patent and Trademark Office*